Nov. 29, 1966  R. DIENER  3,287,763
FEED AND CONTROL DEVICE FOR LINKING AN EXTRUDER
TO A PROCESSING MACHINE
Filed Nov. 10, 1964  2 Sheets-Sheet 1
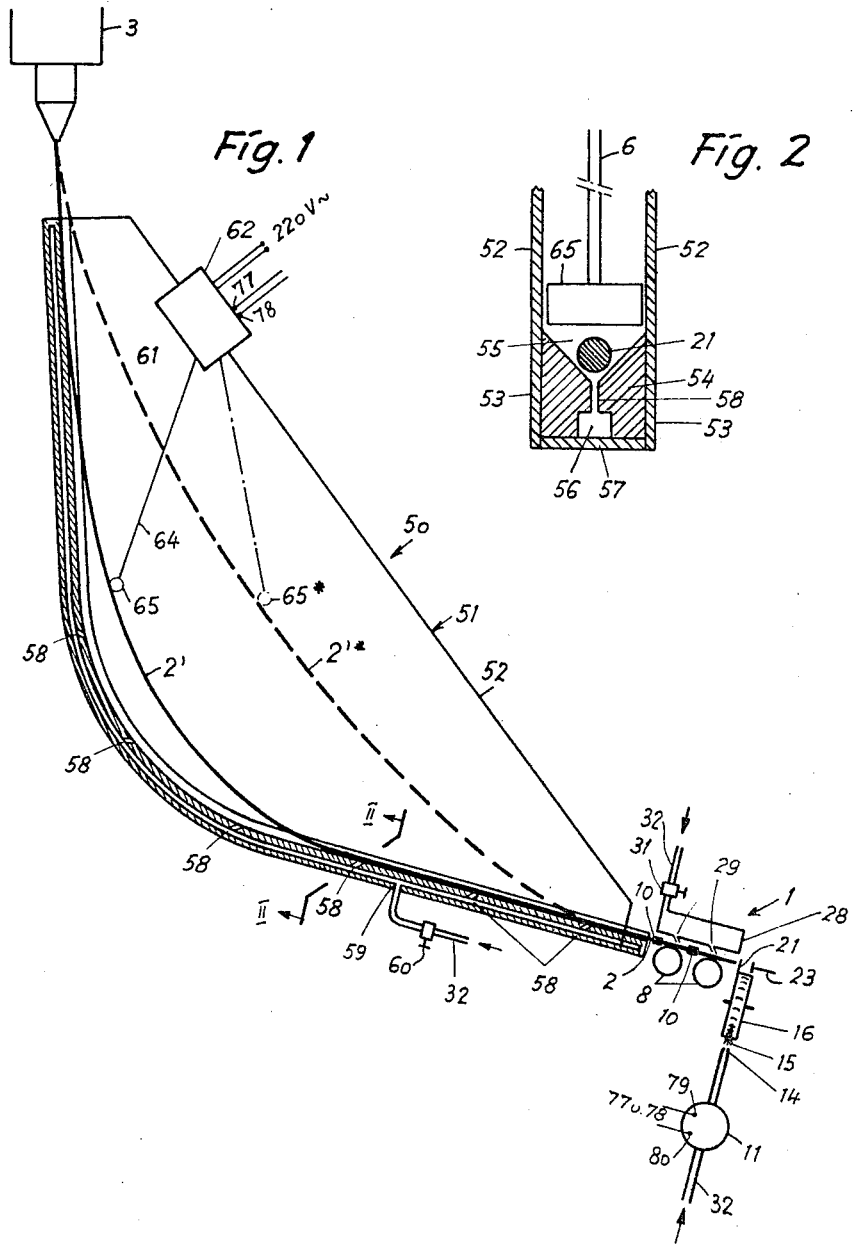
INVENTOR:
RUDOLF DIENER
By
E. M. Squire
HIS ATTY.

INVENTOR:
RUDOLF DIENER
BY
E. M. Squire
HIS ATTY.

United States Patent Office 3,287,763
Patented Nov. 29, 1966

3,287,763
FEED AND CONTROL DEVICE FOR LINKING AN EXTRUDER TO A PROCESSING MACHINE
Rudolf Diener, Zurich, Switzerland, assignor to Eldima A.G., Zurich, Switzerland
Filed Nov. 10, 1964, Ser. No. 410,218
Claims priority, application Switzerland, Apr. 2, 1964, 4,188/64
6 Claims. (Cl. 18—12)

This invention relates to feed and control devices for extruded material and particularly to a feed and control device for linking an extruder to a processing machine for the material extruded.

In co-pending Swiss application No. 13,489/63 there is disclosed apparatus for carrying out a method of cutting pieces off a length of material which comprises a stop, means for advancing a length of material towards said stop, a cutter, a vaned wheel carrying said cutter so that the cutter is rotatable in a plane transverse to the direction of advance of the length to cut off a piece of material when the end of the piece abuts against the stop, means for directing a first jet of fluid on to the vanes of said wheel to rotate same, jet intensity-varying means for varying the intensity with which said jet is directed on to said vanes in response to variations in the speed with which said length end abuts against said stop.

The cutting device of this co-pending application is particularly siutable for cutting extruded rods of explosive materials into uniform pieces. The rod which is to be cut is delivered by an extruder. It is important for satisfactory operation of the arrangement that the speed of extrusion and the rate of operation of the cutting device should be fully co-ordinated, that is to say that these speeds must compensate one another automatically. In such production, it is important that production should not stop should a breakage occur in the extruded material.

It is an object of the present invention to provide a feed and control device for linking an extruder to a processing machine for material extruded by the extruder, which device avoids stoppage of production in the event of a breakage occurring in the extruded material.

According to the present invention there is provided a feed and control device for linking an extruder to a processing machine for material extruded by the extruder which device comprises director means for directing the extruded material to a point of entry into the processing machine, said directing means being such as to allow sagging of extruded material, and control means for utilising the magnitude of said sagging to control the speed of operation of the processing machine.

The director means may include a curved member having one end aligned with the output end of the extruder and the other end aligned with the input end of the processing machine, the curved member being such that at said ends the respective parts of the member are straight line continuations of the output passage of the extruder and input passage of the processing means respectively and means for passing a gas through said member in such a manner as to tend to keep the extruded material out of contact wih the bent member other than along said straight line continuations. The curved member, preferably of hyperbolic configuration, may have a guide groove in communication with a duct, means being provided for passing gas under pressure into said duct so that it passes into said groove and acts to keep the extruded material out of contact with the groove other than along the appropriate end parts of the groove, which constitute said continuations. The duct and groove communicate through bores which connect the duct to the base of the groove, said fluid flowing through the bores having a velocity component tending to urge the extruded material in the groove away from the base of the groove and a component tending to advance the extruded material towards the processing machine.

The control means may include mechanical sensing means engaging the sagging part of the extruded material and displaced in response to variations in the amount of sag, translating means for translating the movement of the sensing means into electrical impulses and means for utilising the electric impulses to control the operation of the processing means.

Other features of the present invention will be readily apparent from the following description with reference to the accompanying drawings forming a part hereof and in which:

FIG. 1 is a side view of one embodiment of a feed and control device of the invention by means of which a rod delivered to an extrusion press is fed to a cutting device;

FIG. 2 is a cross-section on the line II—II of FIG. 1;

Figure 3:
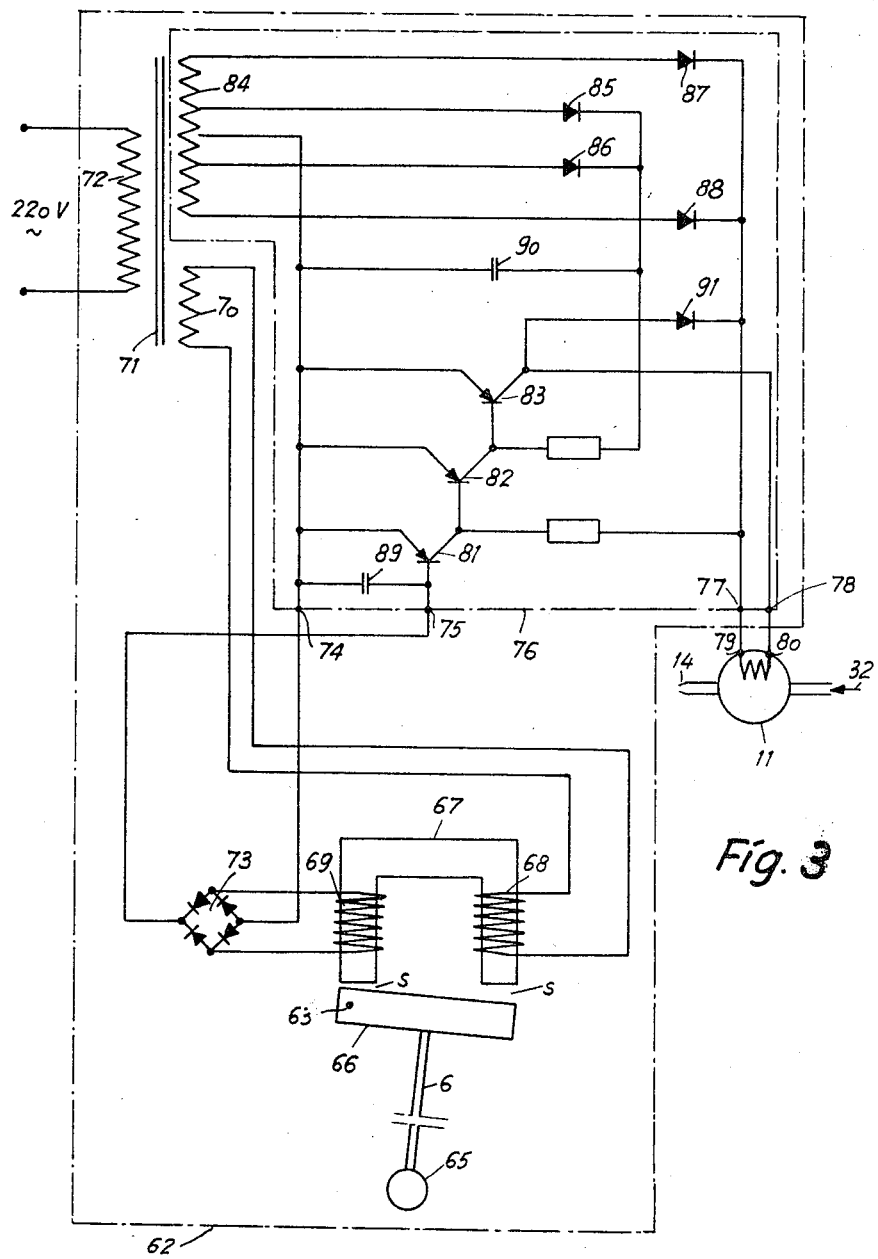
FIG. 3 is a circuit diagram of a controller included in the feed and control device.

The arrangement diagrammatically illustrated in FIG. 1 comprises a cutting device 1. This cutting device will be described to the extent necessary only for an understanding of its function, and in order to facilitate comparison with the above-mentioned patent specification like parts in the two specifications have been given the same reference numerals.

The cutting device 1, by means of which a nitro-cellulose rod or extrusion 2 of a thickness, for example, of 2.5 to 3 mm. supplied continuously by an extrusion press 3, is cut into pieces of a length, for example, of from 5 to 15 mm., comprises a cutter blade 21 disposed on a vane wheel 16. The latter is rotated by a jet of compressed air 15 issuing from a nozzle 14. An electromagnetic valve 11 connected to a compressed air supply conduit 32 controls the jet 15. Peripherally grooved feed rollers 8 receive and advance the rod 2. Rollers 8 are disposed beneath a compressed air cylinder 28 also connected to the feed conduit 32 via an adjustable valve 31. The cylinder 28 is provided with outlet nozzles 29 from which emerge jets of compressed air which simultaneously press the rod 2 downwardly into the grooves of the feed rollers 8 and rotate the latter. The rod 2 passing through guide bushes 10 is advanced by the feed rollers 8 until its free end reaches an adjustable stop 23; during the resultant standstill of the rod 2 the cutter 21 cuts the extrusion 2 at a distance from the stop 23, corresponding to the desired length of the severed pieces, whereupon the latter is immediately again advanced as far as the stop 23.

Between the extrusion press 3 and the cutting device 1 the rod 2 has a sagging portion 2' the length of which varies if the delivery speed of the extrusion press 3 does not correspond exactly to the working speed of the cutting device 1. Assuming that the sagging part 2' is in the solid-line position when the said speeds correspond exactly and that the speed of revolution of the wheel 16, i.e., the working speed of the cutting device 16, increases for some reason, for example owing to a rise in the pressure of the compressed air, the sagging portion 2' will shorten and assume the position shown in dashed lines for example, i.e., the position 2'. Since the part 2' would finally break, steps must be taken to ensure that the jet of air 15 is throttled by the electromagnetic valve 11 to reduce the working speed of the cutting device 1. To this end, in the specification of the above-mentioned patent application, photo-electric sensing means are provided to control the electromagnetic valve 11 in dependence on the position of the part 2'.

This control problem is solved in the present case by a device 50 which is not only simpler and more reliable than the previously proposed control device but also solves another important problem. Since the nitro-cellulose rod 2 delivered by the extrusion press 3 is of only very low tensile when it leaves the press, it frequently breaks. In the absence of other steps, the rod 2 would have to be manually re-introduced into the guide bushes 10 after difficult control operations. The present device 50 ensures that in the event of a breakage of the rod the free rod end continuously moving away from the extrusion press is automatically re-introduced into the guide bushes 10, i.e., is fed to the cutting device 1 in the position required for its correct reception. The following description shows how the device 50 performs its feed and control operations.

The feed and control device 50 comprises a frame 51 which consists mainly of two parallel vertical plates 52 which are spaced about 1 to 2 cm. apart and which according to FIG. 2 are secured along opposite edge zones 53 on a bearer 54 for example by screws (not shown). The inside of the bearer 54 is formed with a large groove 55 of triangular cross-section and the outside is formed with a somewhat smaller groove 56 of rectangular cross-section covered by a strip of sheet-metal 57 so as to form a duct. The grooves 55 and 56 are interconnected by a plurality of bores 58 inclined to the longitudinal direction of the grooves 55 and 56 at an angle of about 30 to 60°, for example 45°. The top part of the bearer 54 and hence the grooves 55 and 56, in their region adjacent the extrusion press 3, extend rectilinearly and substantially vertically and then pass tangentially to an arcuate middle part from which they pass tangentially to a bottom rectilinear part slightly inclined to the horizontal. The bottom part of the inner groove 55 is aligned with the guide bushes 10 of the cutting device 1.

At the top and bottom the sagging part 2' of the rod is situated at least approximately on the base of the inner groove 55 while depending upon the amount of sag its middle part is outside the groove 55 to a varying amount. The duct formed by the outer groove 56 is also connected to the compressed air supply conduit 32 via an adjustable valve 60 at a place 59 situated between its closed ends. The bores 58 are so inclined that the air jets entering the groove 55 from the duct 56 through said bores have a velocity component in the advancing direction of movement of the rod part 2' to feed the same to the cutter device 1 and also a component which blows the rod part 2' away from the base of the groove 55 in order to avoid any friction of this part 2' against the base of the groove.

In the event of a rod breakage, the front end of the rod 2 is processed without any change, i.e., cut into pieces. The rear portion of the rod 2 is conveyed on with practically no friction by the air jets leaving the bores 58 and forming an air cushion and finally comes automatically from the bottom part of the groove 55 in exactly the correct position in relation to the inlet to the cutting device 1 so that it is introduced into the latter and both the extrusion operation and the cutting operation continue with practically no disturbance.

For adaptation of the working speed of the cutting device 1 to the extrusion speed of the press 3 a controller 62 is secured in an edge cut-out 61 of the plates 52 and comprises a swing arm 64 pivotable about an axis 63, the bottom free end of the arm being provided with a transverse element 65 used as a sensing element. The arm 64 is not directly rotatable on the axis 63 but, as shown in FIG. 3, is secured to movable magnetic element 66 which is pivoted for angular displacement on the axis 63. The magnetic element 66 cooperates with a U-shaped set of laminations 67 to form a transformer core 66, 67 with two serially arranged variable air gaps $s$. A primary winding 68 and a secondary winding 69 are provided on the two legs of the U-shaped laminations 67. The primary winding 68 is coupled to a secondary winding 70 of an input transformer 71 whose primary winding 72 is connected to the A.C. power supply of, for example, 220 volts.

The secondary winding 69 of the control transformer 66–69 feeds a rectifier bridge 73 whose output voltage is fed to the input terminals 74 and 75 of a D.C. amplifier 76. The amplified D.C. voltage is fed from the output terminals 77 and 78 of the amplifier 76 to the input terminals 79 and 80 of the electromagnetic valve 11.

The D.C. amplifier 76 comprises three cascade-connected transistors 81 to 83 whose emitter-collector voltages are supplied by a rectifier with two D.C. voltage stages, such rectifier consisting of a center-tapped second secondary winding 84 of the power transformer 71 and two pairs of diodes 85, 86 and 87, 88. Capacitors 89 and 90 are smoothing capacitors and 91 is a buffer diode in parallel with the magnet winding 92 of the electromagnetic valve 11. Amplifier 76 operates in conventional manner so that there is no need for a description thereof.

The controller 62 operates as follows: if, as a result of the cutting device 1 operating faster than the extrusion rate of press 3, the rod part 2' reaches the position 2', the yoke 66 is pivoted counterclockwise as viewed in FIG. 3 by the sensing element 65 moving into the position 65. Consequently, the total air gap, $s$ of the control transformer core 66, 67 is reduced, and the voltage delivered by the secondary winding 69 to the rectifier bridge 73 is increased. The current delivered by the D.C. amplifier 76 to the magnet winding 92 of the electromagnetic valve 11 is thus also increased. The electromagnetic valve 11 is so designed that with an increasing input current its free passage cross-section decreases so that with a decreasing sag of the part 2' the air jet 15 is throttled so that the working speed of the cutting device 1 is reduced. If this working speed finally drops below the speed of operation of the press 3, the sag will increase again so that the part 2' once again approaches the solid-line position. Thus, in practice, there will be a slow swing about a position of equilibrium which may shift slowly depending upon the pressure of the compressed air, the consistency of the rod 2 and other factors.

The feed and control device 50 as described is very simple and reliable and is an important advance in this art. It is clear that it can be applied not only to the supply of nitro-cellulose or other rods of explosive material to cutting devices but can be generally used between an extrusion press and an extruded material processing machine of any kind.

The electromagnetic valve 11 may of course be so constructed as to be closed when the magnet winding 92 is not energised and open in proportion to the energisation current. In such a case the pivoting element 66 must be so disposed that the air gap $s$ is increased with increasing tautness of the sagging part 2'; the axis 63 must then be provided at the opposite end of the pivoting element. It is also apparent that a voltage regulator may be used to stabilise the voltage fed to the primary winding 68 of the control transformer 66–69 so as to eliminate any influence of power supply voltage fluctuations.

What is claimed is:

1. A device of the class described, comprising: a director member having a straight input portion for continuously receiving an extrusion from extrusion means and a straight output portion for delivering said extrusion to processing means, said input and output portions being interconnected by a curved portion to define a smooth laterally open passage for said extrusion, said input portion being aligned with said extrusion as it enters said director member and said output portion being aligned with the portion of said processing means to which said extrusion is delivered, said extrusion being gravitationally urged to sag into contact with said curved portion, the maximum sag of said extrusion intermediate said input and output portions being limited by said curved portion; sensing means responsive to the amount of said sag; control means responsive to said sensing means and connected to control the difference between the rates of reception and delivery of said extrusion into and from said director member for maintaining the average effective magnitude of said sag at a predetermined value; and means included in said director member for directing a fluid against said extrusion to prevent contact between said extrusion and said passage.

2. A device according to claim 1, wherein said means for directing said fluid comprises means for forming said fluid into a plurality of jets each of which has a velocity component urging said extrusion away from said passage and a further velocity component urging advancing movement of said extrusion from said input portion toward said output portion.

3. A device according to claim 1, wherein said control means is connected to control the rate of operation of said processing means.

4. A device according to claim 3, wherein said sensing means mechanically engages said extrusion intermediate said input and output portions of said director member; in which said control means comprises means responsive to the position of said sensing means for producing an electrical control signal; and wherein said processing means comprises means connected for response to said control signal for varying the rate of operation of said processing means.

5. A device of the class described, comprising: extrusion means continuously producing a generally downwardly moving extrusion; processing means comprising a generally horizontally directed receiving passage into which said extrusion is delivered; two spaced vertical plate members between which said extrusion is laterally confined during the course of its passage from said extrusion means to said processing means; a guide member positioned between said plate members, said guide member comprising a straight inlet portion aligned with said extrusion as it emerges from said extrusion means and a straight outlet portion aligned with said receiving passage, said inlet and outlet portions being smoothly interconnected by a curved portion which underlies said extrusion intermediate said plate members, said extrusion being gravitationally urged toward said curved portion; sensing means freely movable intermediate said plate members for engagement with said extrusion above said curved portion, said extrusion having a sag intermediate said inlet and outlet portions the magnitude of which varies in accordance with any difference between the velocities of said extrusion in said input and output portions, the instantaneous magnitude of said sag being sensed by said sensing means and the maximum magnitude of said sag being limited by engagement of said extrusion with said curved portion; control means responsive to the position of said sensing means; means connected to said control means for varying said difference between said velocities to maintain the effective average magnitude of said sag at a constant value; and means for producing a series of air jets emanating from said guide member and directed toward said extrusion, each of said jets having a velocity component urging said extrusion away from said guide member and a further velocity component urging said extrusion to move toward said outlet portion.

6. A device according to claim 5, wherein said processing means comprises an air driven knife which cuts said extrusion into lengths after passage through said receiving passage, the average velocity of said extrusion in said outlet portion being determined by the operational speed of said knife, said processing means including controllable air valve means for varying said operational speed; and in which said control means comprises means connected to said air valve means for the control thereof.

References Cited by the Examiner

UNITED STATES PATENTS

| | | | |
|---|---|---|---|
| 1,624,826 | 4/1927 | Bulley | 18—12 X |
| 2,167,971 | 8/1939 | Cadden | 18—12 |
| 2,393,452 | 1/1946 | Barley et al. | 18—12 |
| 2,544,467 | 3/1951 | Michel. | |
| 2,607,074 | 8/1952 | Slaughter | 18—12 X |
| 2,726,922 | 12/1955 | Merrill et al. | 18—2 |
| 2,737,089 | 3/1956 | Baumgartner. | |

WILLIAM J. STEPHENSON, *Primary Examiner.*